United States Patent [19]

Brody

[11] 4,431,331
[45] Feb. 14, 1984

[54] FRAME CONNECTOR STRUCTURE
[75] Inventor: Charles Brody, Highland Park, Ill.
[73] Assignee: Paul Alperson, Omaha, Nebr.
[21] Appl. No.: 466,787
[22] Filed: Feb. 16, 1983
[51] Int. Cl.³ ............................................. F16B 7/00
[52] U.S. Cl. .................................. 403/189; 403/246; 403/329
[58] Field of Search ............... 403/329, 330, 246, 245, 403/108, 189, 187; 292/352

[56] References Cited

U.S. PATENT DOCUMENTS

| | | | |
|---|---|---|---|
| 2,739,006 | 3/1956 | Fisler | 292/352 |
| 3,091,490 | 5/1963 | Williams | 24/230 R X |
| 3,603,628 | 9/1971 | Smith | 403/329 |
| 4,391,545 | 7/1983 | Zummer | 403/246 X |

FOREIGN PATENT DOCUMENTS 1234390 6/1971 United Kingdom ................. 403/108

Primary Examiner—Andrew V. Kundrat
Attorney, Agent, or Firm—George R. Nimmer

[57] ABSTRACT

One of two elongate tubular frame members to be removably connected is telescoped over, and frictionally and also latchably removably secured to the intervening connector structure. The connector structure comprises a conventional rigid body component of inverted U-shaped configuration including apertured horizontal wall and two vertical flanking-walls, for respective broad frictional engagements with the apertured top-panel and the two vertical panels of the surrounding tubular frame member. Departing from the prior art, the connector structure herein comprises a J-shaped spring means, the longerleg extending along the inner surface of the connector apertured horizontal wall and being provided with an upwardly extending locking projection surrounded by said wall aperture, and the shorterleg extending below the bottom-plane of the body flanking-walls. Thus, as the tubular frame member is telescoped over the novel frame connector structure, the frame bottom-panel forces the spring member shorterleg above the body component bottom-plane thereby increasing the broad frictional contact between the apertured connector wall and the frame top-panel, and also assisting in maintaining the longerleg locking projection securely latched within the frame top-panel aperture.

7 Claims, 11 Drawing Figures

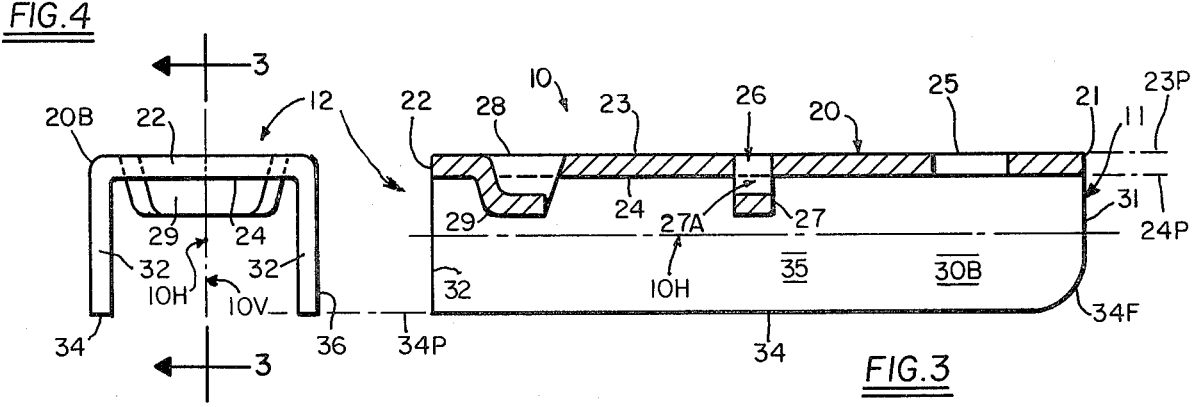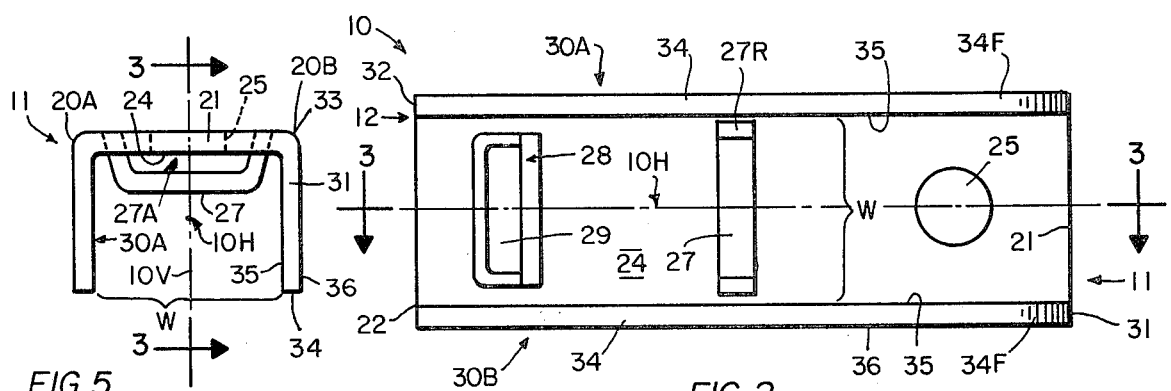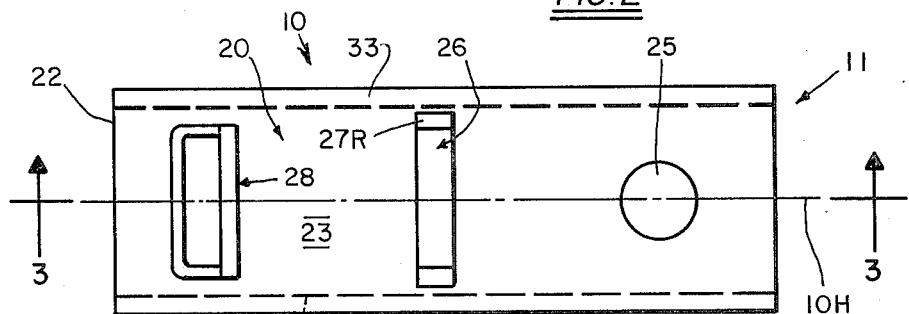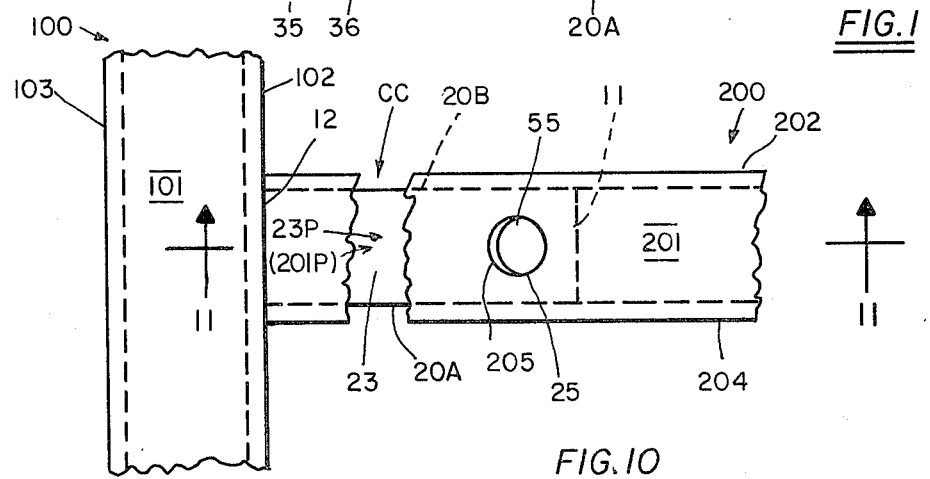

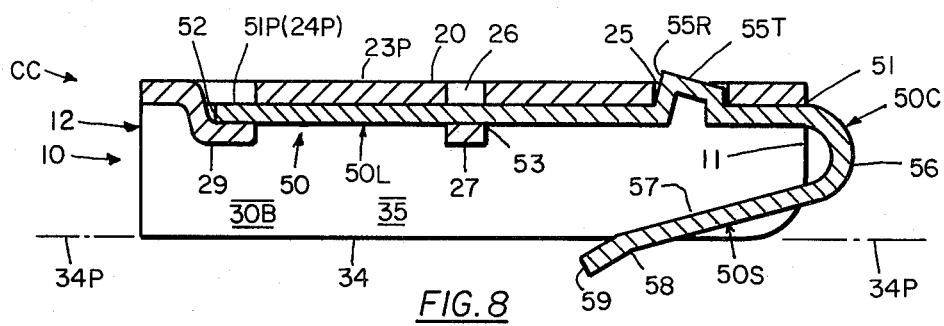
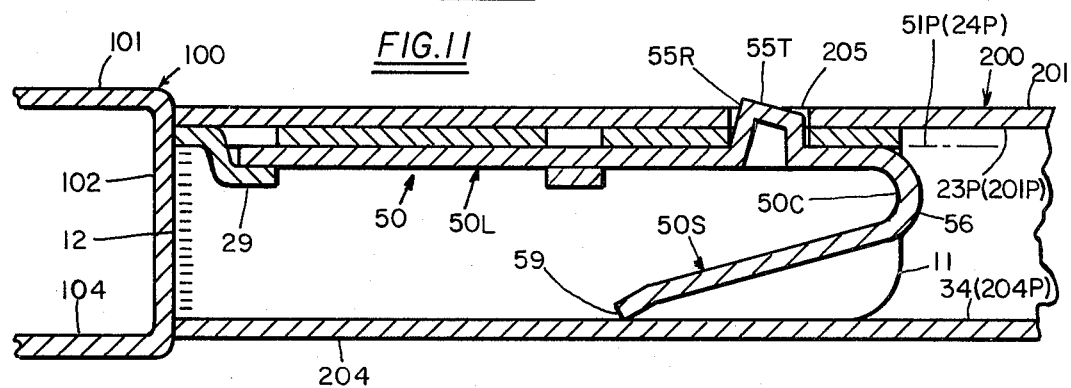
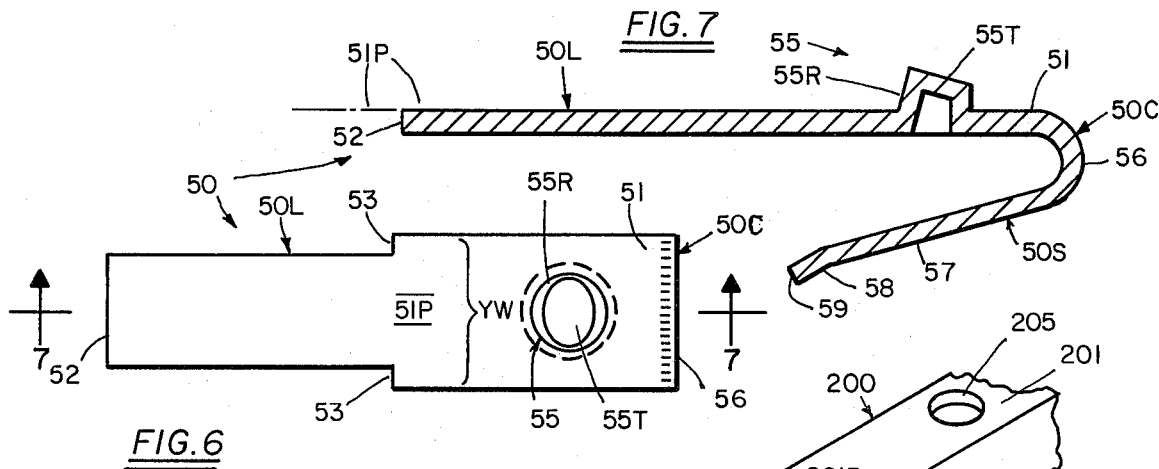
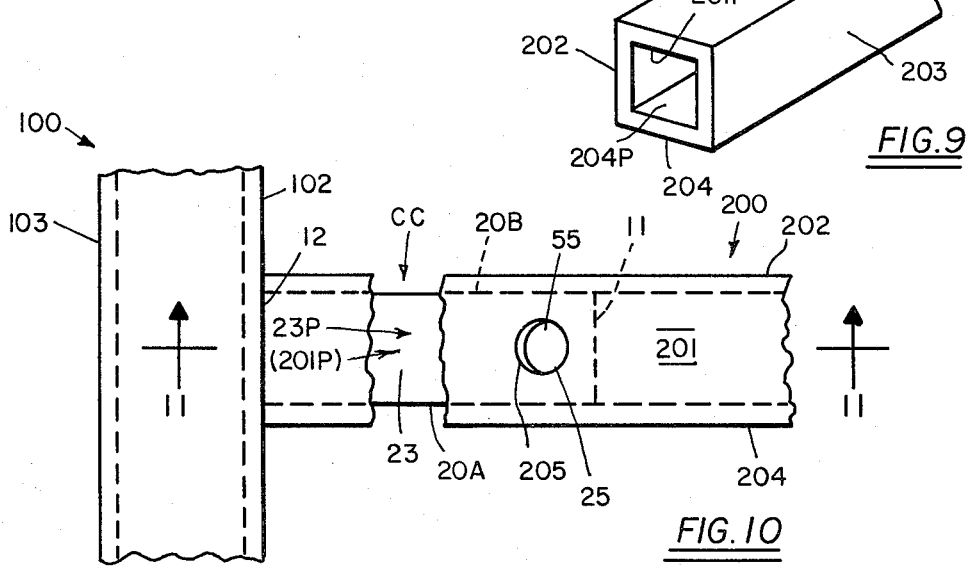

FRAME CONNECTOR STRUCTURE

BACKGROUND OF THE INVENTION

The present invention relates to frame connector structures of the types generally described in U.S. Pat. No. 3,603,628(Smith, et al—Sept. 7, 1971) and in pending U.S. patent application Ser. No. 06/117,252(Zummer-filed Jan. 31, 1980). Such prior art connector structures generally comprise: a rigid body component of inverted U-shaped configuration comprising three planar walls including an apertured horizontal wall and two vertical flanking-walls having co-elevational bottom-edges defining the body component bottomplane; and a spring means attached to the body component and positioned loftily above and parallel to the bottomplane so as to extend along the apertured wall inner surface, the spring member carrying a locking projection extending upwardly through the horizontal wall aperture. Such prior art connector structures are intended to be closely telescopically received within an end of an elongate tubular frame member comprising interconnected longitudinal panels. The tubular frames are typically of rectangular cross-sectional shape and including: vertical left-panel and right-panel for frictional engagements along the connector body flanking-walls; a horizontal bottom-panel for frictional engagement along the connector body bottom-plane; and an apertured top-panel for frictional engagement along the outer surface of the connector horizontal wall. These four frictional engagements entirely suffice for rigidly maintaining the intended longitudinal directional orientation for the tubular frame member (and without the necessity for the latching assist by the spring means locking projection). However, after some weeks or months of post-installation wear-and-tear, the walls/panels frictional engagements have become diminished to such extent that the spring means latching upwardly through the frame aperture becomes absolutely necessary to rigidly maintain the frame member longitudinal orientation. Prior art workers have proceeded under the assumption that nothing can be done about the progressive diminishment of the walls/panels frictional engagement forces, whereby their efforts have been devoted almost exclusively to increasing the strength and reliability of the spring means at the latchable locking projection.

OBJECT OF THE INVENTION

It is the general objective of the present invention to provide an improved frame connector structure that rigidly maintains the intended longitudinal orientation for the telescopically surrounding tubular frame member by virtue of counteracting the progressive diminishment of the walls/panels frictional engagement forces and specifically along the connector apertured wall and the frame top panel, and as well as by increasing the latching strength and reliability of the spring means locking projection.

SUMMARY OF THE INVENTION

With this general objective in view, and along with related objectives which will become more apparent as this description proceeds, the novel frame connector structure of the present invention generally comprises: a longitudinally extending rigid body of inverted U-shaped configuration including an apertured horizontal wall extending longitudinally between body fore-end and rear-end and having horizontal inner and outer surfaces, said wall between the aperture and body rear-end being provided with an underlying strap and also with shelf means below the wall inner surface, said body component also including a pair of parallel vertical flanking-walls having longitudinally extending horizontal bottom-edges defining a horizontal bottom-plane; and a generally J-shaped spring member including horizontal longerleg, shorterleg therebelow, and upright curvilinear juncture portions together provided by a single length of permanently bent springy metallic material, the J-shaped spring at the longerleg rearward-end being supported atop the body component shelf means and being surrounded by the body component underlying strap whereby the longerleg upper surface is loftily above the bottom-plane and lies alongside the apertured wall inner surface, said longerleg being provided with an upwardly extending locking projection surrounded by said body wall aperture, and at least a portion of the spring member shorterleg lying below said body component bottom-plane. Thus, when the connector structure is telescopically received within an end of a said hollow tubular frame member, the frame member bottom-panel forces the spring member shorterleg above the bottom-plane thereby increasing the broad frictional contact between the apertured connector wall and the frame top-panel, and also assisting in maintaining the longerleg locking projection latchably within the top-panel aperture.

BRIEF DESCRIPTION OF THE DRAWINGS

In the drawings, wherein like characters refer to like parts in several views, and in which:

FIG. 1 is a top plan view of the preferred body component of a representative embodiment of the frame connector structure of the present invention;

FIG. 2 is a bottom plan view of the FIG. 1 body component, along the bottom-plane(34P) thereof;

FIG. 3 is a longitudinally extending sectional elevational view taken along lines 3—3 of FIGS. 1, 2, 4, and 5;

FIG. 4 is a rearward elevational view of the FIG. 1 body component;

FIG. 5 is a forward elevational view of the FIG. 1 body component;

FIG. 6 is a top plan view of a preferred J-shaped spring component of a representative embodiment of the frame connector structure of the present invention;

FIG. 7 is a sectional elevational view of the J-shaped spring component taken along line 7—7 of FIG. 6;

FIG. 8 is a sectional elevational view of a representative embodiment of the frame connector structure, and resulting from a superimposition of FIG. 7 upon FIG. 3;

FIG. 9 is a perspective view of a tubular frame member that is longitudinally orientable by the frame connector structure of the present invention;

FIG. 10 is a top plan view of tubular frame members (including that of FIG.9) effected into removably connected relationship with the FIG. 8 representative frame connector structure;

FIG. 11 is a longitudinally extending sectional elevational view taken along line 11—11 of FIG. 10.

As will be explained later in greater detail relative the description of drawing FIGS. 8–11, the frame connector structure (e.g.CC) of the present invention generally comprises a longitudinally extending rigid hollow body component (such as depicted as body 10 in FIGS. 1–5)

and a longitudinally extending J-shaped spring member component including upwardly extending locking projection means (such as depicted as J-shaped spring 50 in FIGS. 6–7).

Turning initially to drawing FIGS. 1–5, the preferred embodiment body component 10 is a rigid hollow member extending longitudinally along horizontal central-axis 10H, and having two upright body-ends including fore-end 11 and rear-end 12. Body 10 includes an apertured (25) horizontal wall e.g. 20, extending longitudinally between the upright body-ends 11 and 12 and including planar outer surface 23 and planar inner surface 24. Herein, apertured wall 20 is rectangular as seen in top plan view and including: transversely extending and parallel lead-end 21 and tail-end 22 at body fore-end 11 and at rear-end 12, respectively; longitudinally extending and parallel left-edge 20A and right-edge 20B at outward surfaces 36 of parallel vertical flanking-walls 30A and 30B, respectively; and longitudinally extending and parallel planar rectangular surfaces 23 and 24 defining respectively horizontal outer-plane 23P and horizontal inner-plane 24P. The preferred body component 10 is substantially U-shaped in transverse cross-section including the two vertical flanking-walls 30A and 30B, each extending longitudinally (31–32) between the upright body-ends 11 and 12. Each flanking wall 30 has a longitudinally extending horizontal top-edge 33 merging along the entire length 21–22 of wall edges 20A and 20B whereby transversely separated ("W")flanking-walls 30A and 30B depend from intervening apertured wall 20 and are in structurally continuous monolithic relationship therewith. Each vertical flanking-wall 30 has an upright inward surface 35 and an upright outward surface 36, surfaces 35 and 36 being preferably vertical, planar, and parallel to each other and to vertical-axis 10V, whereby there is a regular transverse finite-width "W" between flanking-walls inward surfaces 35. The longitudinally extending bottom-edges 34 of flanking-walls 30A and 30B are horizontal, co-elevational, and parallel to axis 10H, thereby defining a horizontal bottom-plane 34P for body component 10 and for connector CC. Each flanking-wall 30 is rounded (34F) at its lower/forward corner. Wall aperture 25 overlies axis 10H and is located much nearer to body fore-end 11 (e.g. lead-end 21) than to body rear-end 12 (e.g. tail-end 22).

The body component (e.g.10) is provided with spring mounting means located a small finite-distance below said wall inner surface and between the aperture 25 and the body rear-end; the purpose of such mounting means is to maintain the unstressed spring longerleg (e.g. 50L) immediately alongside the wall inner surface 24, as alluded to in FIG. 8. Herein, primary wall 20 between its aperture 25 and its tail-end 22 is transversely struck therethrough whereby wall 20 is provided with a transversely extending fore-slot 26, with wall structural material being depressed therebelow to provide a transversely extending horizontal strap that is spatially (27A) recessed below wall inner surface 24 and plane 24P. There is also shown a transversely extending shelf means e.g. 29, that is spatially recessed below wall inner surface 24 for supporting the J-spring longerleg rearward-end 52. The spatial gaps below plane 24P are of substantially equal finite-distances. Herein primary wall 20 between fore-slot 26 and strap 27 and tail-end 22 is transversely struck therethrough to provide a transversely extending slot 28 with wall structural material being depressed therebelow to provide shelf 29. For reasons to be explained later in greater detail, the transverse width of strap 27 and of shelf 29 are somewhat less than walls spacing "W".

The aforedescribed body component will be combined with a novel J-shaped spring member (e. g. of FIGS. 6–7) to provide the novel frame connector structure e.g. that of FIG. 8. As indicated in FIG. 8, the J-spring shorterleg (e.g. 50S) must extend below body component bottom-plane 34P, whereby (as seen in FIG. 10) this shorterleg is forced upwardly by a frame bottom-panel (e.g. 204) to provide unrelieved spring stress transmitted to the telescopically received tubular frame (e.g. 200). As seen in FIG. 9, a typical such longitudinally extending tubular frame member comprises four interconnected longitudinal panels including: bottom-panel 204 having its inside surface along inside-plane 204P, left-panel 202, right-panel 203, and apertured (205) top-panel 201 having its interior surface along interior-plane 201P.

Turning now to drawing FIGS. 6–8 which depict a representative embodiment 50 of the J-shaped spring member, fabricated from a single length of permanently bent metallic structural material. It is seen in FIG. 7 that spring member 50 in side elevation has a generally J-shaped configuration with three main portions along the length thereof including: a longitudinally horizontally (51P) extending longerleg 50L; a non-horizontal shorterleg 50S located below longerleg 50L and terminating below co-elevational planes 34P and 204P; and a curvilinear juncture portion 50C connecting the longerleg forward-end 51 to shorterleg 50S.

J-spring longerleg 50L has generally planar parallel lower and upper horizontal surfaces, the latter defining said plane 51P, the two surfaces having a vertical separation of substantially said finite-distance value. Thus, when longerleg 50L has its rearward-end 52 resting atop a body shelf (29) and has its medial portion resting atop a strap (27), its upper surface plane 51P will be made co-elevational with apertured wall inner-plane 204P. Longerleg 50L, immediately rearwardly its forward-end 51, is provided with an upwardly extending locking projection 55 surrounded by wall aperture 25. According to conventional practice, locking projection 55 includes sloping surfaces 55R and 55T. The predominant entire length of spring 50 has a constant transverse width "YW" that is substantially equal to the flanking-walls spacing "W" so as to maintain the spring in strict longitudinal direction. However, longerleg length portion 53–52 is desireably transversely narrower than "YW" to permit the longerleg at 53 to abut against the forward side of strap-type mounting means 27.

J-spring shorterleg 50S preferably includes a forward major-length 57 extending downwardly and rearwardly from curvilinear juncture portion 50C, and a rearward minor-length 58 extending downwardly and rearwardly from major-length 57 and which minor-length (being preferably linear) is predominately below and terminates (59) below bottom-plane 34P. As seen in FIG. 8, the J-spring forward extremity, at curvilinear juncture portion 50C, normally provides the forward extremity of the assembled frame connector (CC).

Turning now to drawing FIGS. 10 and 11 which depict typical usage of the frame connector structure (CC) for maintaining the longitudinal orientation of an alongate frame member (200). Body rear-end 12 of connector CC is rigidly attached (as by welding) to planar panel 102 of environmental tubular frame 100 comprising interconnected planar panels 101–104. Then, that end of tubular frame 200 seen in FIG. 9 is longitudinally slidably telescoped over connector CC until reaching substantially rear-end 12. As previously indicated, the vertical distance between tubular frame planes 201P and 204P is substantially equal to the vertical distance between body planes 23P and 34P, and the transverse distance between frame panels 202 and 203 is substantially equal to the transverse distance between flanking-walls outward surfaces 36. Thus, tubular frame bottom-panel 204 forces spring member shorterleg 50S wholly above connector bottom-plane 34P and induces unrelieved stress along the entire J-shaped spring member 50. In FIG. 11, this unrelieved stress is manifested as a constriction in curvilinear juncture portion 50C and as a marked increase in pressure of longerleg 50L along body component inner surface 24.

The aforedescribed marked increase in pressure of longerleg 50L along body component inner surface 24 increases the broad frictional contact between the apertured connector wall 20 and the frame top-panel 201 along co-elevational planes 23P and 201P. Such increase in broad frictional contact, effected by the FIG. 11 stressed condition for J-spring 50, achieves the primary objective of this invention, namely: to counteract the inherent tendency for gradual diminishment of frictional engagement between the connector walls and the tubular frame panels, and which tendency has heretofore been considered unpreventable by persons skilled in this art. As an incidental benefit, the J-spring concept of the present invention also has the desireable function of maintaining the spring locking projection (55) upwardly latchably secured within the aligned apertures (e.g. 25 and 205).

Whenever it is desired to longitudinally disengage tubular frame 200 from connector CC, a hammer or other tool is employed to resiliently depress locking projection 55 below frame aperture 205 and to the extent where spring longerleg 50L is disposed below body component inner surface 24.

From the foregoing, the construction and operation of the frame connector structure will be readily understood and further explanation is believed to be unnecessary. However, since numerous modifications and changes will readily occur to those skilled in the art, it is not desired to limit the invention to the exact constructions shown and described, and accordingly, further modifications and changes may be resorted to, as encompassed by the scope of the appended claims.

What is claimed is as follows:

1. A frame connector structure adapted to be closely telescopically received within, and forming a rigid joint with, a longitudinally extending tubular frame member including a frame bottom-panel lying along a bottom-plane and a frame apertured top-panel, said frame connector structure comprising:

A. a longitudinally extending rigid body of inverted U-shape configuration having two upright body-ends including a fore-end and a rear-end, said body component comprising a forwardly apertured horizontal wall extending longitudinally between the body-ends and including horizontal outer and inner surfaces, said apertured wall between the apertured portion and the body rear-end being provided with transversely extending spring member mounting means located a small finite-distance below said wall inner surface and between the aperture and the body rear-end, said body component also comprising a pair of parallel and transversely separated flanking-walls, the flanking-walls having longitudinally extending horizontal co-elevational bottom-edges defining a horizontal bottom-plane for the body component; and B. a spring member in elevation having a generally J-shaped configuration and including longerleg, shorterleg therebelow, and curvilinear juncture portions together provided by a single length of permanently bent springy metallic material, Bi. the spring member longerleg portion extending longitudinally horizontally from rearward-end to a forward-end merging at said curvilinear juncture portion, said longerleg having generally planar parallel upper and lower surfaces with a vertical separation of substantially said finite-distance, said longerleg being held by said body component spring member mounting means in a condition whereby the major longitudinal length thereof is immediately alongside the apertured wall inner surface, said spring member longerleg immediately rearwardly its forward-end being provided with an upwardly extending locking projection surrounded by said body wall aperture, and Bii. at least a portion of the spring member shorterleg lying in elevation below said body component bottom-plane, whereby: when the frame connector structure is telescopically received within a said tubular frame member, the frame member bottom-panel forces the spring member shorterleg wholly above said bottom-plane and induces unrelieved stress along the entire spring member which stress increases the broad frictional contact between the apertured connector wall and the frame top-panel and also assists in maintaining the longerleg locking projection within the top-panel aperture.

2. The frame connector structure of claim 1 wherein the transversely extending spring member mounting means comprises: the body apertured wall between the apertured portion thereof and the body rear-end is provided with a transversely extending strap located a said finite-distance below said wall inner surface; and said apertured horizontal wall between said transverse strap and said body rear-end is further provided with transversely separated shelf means located substantially said finite-distance below said wall inner surface; whereby: the spring member longerleg rearward-end might rest upon said shelf means and the medial portion thereof might rest upon said transversely extending strap.

3. The frame connector structure of claim 2 wherein the spring member longerleg, commencing at the transversely extending mounting strap and extending to the longerleg rearward-end, is transversely narrower than that portion of the longerleg located immediately forwardly of said strap.

4. The frame connector structure of clam 3 wherein the spring member shorterleg includes a forward major-length extending downwardly and rearwardly from the curvilinear juncture portion and a rearward minor-length extending linearly downwardly and rearwardly from said major-length, said minor-length being disposed below said bottom-plane.

5. The frame connector structure of claim 4 wherein the spring member curvilinear juncture portion extends forwardly of the body component fore-end and provides the frontal extremity of the frame connector structure.

6. The frame connector structure of claim 1 wherein the spring member shorterleg includes a forward major-length extending downwardly and rearwardly from the curvilinear juncture portion and a rearward minor-length extending linearly downwardly and rearwardly from said major-length, said minor-length terminating below said bottom-plane and said major-length being located wholly above said bottom-plane.

7. The frame connector structure of claim 6 wherein the spring member curvilinear juncture portion extends forwardly of the body component fore-end and provides the frontal extremity of the frame connector structure.

* * * * *